(12) United States Patent
Ishimoto et al.

(10) Patent No.: US 6,702,679 B2
(45) Date of Patent: Mar. 9, 2004

(54) ELASTIC COUPLING

(75) Inventors: Yoshitaka Ishimoto, Osaka (JP); Naoki Yamaguchi, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 10/192,466

(22) Filed: Jul. 10, 2002

(65) Prior Publication Data

US 2003/0073500 A1 Apr. 17, 2003

(30) Foreign Application Priority Data

Oct. 11, 2001 (JP) ........................................ 2001-314547

(51) Int. Cl.$^7$ ................................................ F16D 3/62
(52) U.S. Cl. .......................................... 464/69; 464/93
(58) Field of Search ............................... 464/69, 93–96, 464/137; 29/525; 411/180, 338, 339

(56) References Cited

U.S. PATENT DOCUMENTS

| | | | | |
|---|---|---|---|---|
| 2,372,485 A | * | 3/1945 | Griffin | 411/180 X |
| 2,865,138 A | * | 12/1958 | Fawick | 464/137 X |
| 3,228,481 A | * | 1/1966 | Eldred | 464/69 X |
| 3,428,338 A | * | 2/1969 | Corwin | 29/525 X |
| 3,500,659 A | * | 3/1970 | Martin | 464/93 |
| 4,380,442 A | * | 4/1983 | Amsel | 464/93 |
| 4,790,794 A | * | 12/1988 | Takeda et al. | 464/93 |
| 4,828,467 A | * | 5/1989 | Brown | 29/525 X |
| 5,069,586 A | * | 12/1991 | Casey | 411/339 |

FOREIGN PATENT DOCUMENTS

| | | | | |
|---|---|---|---|---|
| JP | 3-239816 | * | 10/1991 | 464/69 |
| JP | 5-14650 | | 2/1993 | |

* cited by examiner

*Primary Examiner*—Greg Binda
(74) *Attorney, Agent, or Firm*—Jordan and Hamburg LLP

(57) ABSTRACT

An elastic coupling, wherein drive side and driven side collars can be press fitted easily, securely and firmly to inner cylinder members with a sufficient interference and which can be used without a danger of axial deviation or disconnection and can be enhanced in durability and reliability. It comprises drive side collars and driven side collars arranged equidistantly on a concentric circle and alternately; belt-like fiber bundles wrapping around adjacent collars; and an elastic material embedding the collars and the belt-like bundles. Cylindrical parts of the collars are integrally formed, on outer peripheries thereof with plural flange parts for holding the belt-like bundles and fitted to inner cylinder members. A central area of each of the inner peripheries of cylindrical parts is formed as a radially expanded portion from the other portion.

4 Claims, 5 Drawing Sheets

PRIOR ART

PRIOR ART

ELASTIC COUPLING

BACKGROUND OF THE INVENTION

1. Field of the Invention

This invention relates to an elastic coupling mainly for use in an automotive vehicle, etc. where it is interposed between drive shafts and driven shafts to transmit a torque while absorbing a vibration, torsion, etc. between both shafts.

2. Description of the Related Art

At a power transmission part of an automobile such as drive shafts, propeller shafts, etc. an elastic coupling having a vibration damping function is used as a coupling for transmitting a torque from the drive shafts to driven shafts.

The elastic coupling is, as exemplified in FIG. 5 and FIG. 6, made up of a plurality of drive side collars (101) adapted to be connected to drive shafts and a plurality of driven side collars (102) to be connected to driven shafts, e.g. drive shafts, both arranged alternately on a concentric circle, endless belt-like fiber bundles (103) each wrapped between adjacent collars in a multi-layer and multi-row, and an elastic material (104) such as rubber, synthetic resin, etc. covering and surrounding these collars (101)(102) and the belt-like fiber bundles (103), thereby being configured as an annular form of a generally polygon or circle.

The aforesaid drive side and driven side collars (101)(102) are each formed with a plurality of flange parts (112)(122) for holding the belt-like fiber bundles 103 on outer peripheral surfaces of cylindrical parts (111)(121). The collars (101)(102) are press-fitted to respective inner cylinder members (105)(106), through which the drive side collars (101) and the driven side collars (102) are, when in use, fixed to drive shafts at their axial ends and to driven shafts at their axial ends, respectively by means of a fastening mean such as bolts, thereby serving to transmit power while absorbing a vibration, etc.

Stated another way, the elastic coupling of this type is capable of elastically deforming in areas between the drive side and the driven side collars (101)(102) embedded in the elastic material (104) and accordingly, serves to perform the power transmission while absorbing a vibration, torsion, etc. in the axial direction generated between the drive shafts and driven shafts by the elastic deformation of the elastic material (104).

For the purposes of rendering such an elastic coupling as stated above more light-weight, recently, it has been considered to use an aluminum-containing metal material such as aluminum, its alloys, etc. for the respective drive side and driven side collars thereby to integrally form them by a casting means such as die casting, etc.

Where the collars are a die cast product made of an aluminum metal material, however, the die cast product singly cannot ensure a sufficient strength required for use. Consequently, it is a general practice to close fit the collars, when in use, by press fitting to respective inner cylinder members.

For an interference upon press fitting as stated above, if the interference value is such that an inner periphery of each collar and an outer periphery of each inner cylinder member are fitted together in an overall axial length of the both, a resistance to the press fitting extends to the overall length and a significant press-fitting force is required. As a result, not only is the press fitting work troublesome, but also a shaving powder can be produced upon press fitting. In that case, there is the danger that the shaving powder clings to inner peripheral surfaces of the cylindrical parts of the collars thereby obstructing the press fitting work to result in a bad press fitting.

On the other hand, if the aforesaid interference value is made smaller, the fit force by press fitting will full short. As a consequence, a large vibration weight is loaded in the axial direction during use, so that where a high load is generated in the belt-like fiber bundles, there occurs a danger of positional deviation or disconnection of the inner cylinder members from the collars.

In view of the problems above, the present invention has been made, and it is an object of the invention to provide an elastic coupling, in which it is possible to press fit the drive side and driven side collars easily, securely and firmly to respective inner cylinder members with a sufficient interference; which can be used without the danger of deviation or disconnecting; and whose durability and reliability can be enhanced.

SUMMARY OF THE INVENTION

This invention relates to an elastic coupling comprising a plurality of drive side cylindrical collars each adapted to be connected through an inner cylinder member to a drive shaft and a plurality of driven side cylindrical collars each adapted to be connected through an inner cylinder member to a driven shaft, both arranged equidistantly and alternately on a concentric circle, endless belt-like fiber bundles each wrapping around adjacent drive side cylindrical collar and driven side cylindrical collar, and an elastic material embedding therein both the collars and the belt-like fiber bundles, the drive side collars and the driven side collars having respective cylindrical parts and plural flange parts, for holding the belt-like fiber bundles, integrally formed on outer peripheral surfaces thereof, the inner cylinder members being fitted in the cylindrical parts of the drive side and driven side collars. The coupling is characterized in that the cylindrical parts of the drive side and driven side collars are formed, in axially central areas on inner peripheral surfaces thereof each as a radially expanded portion from the other portion of each of the inner peripheral surfaces.

According to the elastic coupling, because of the fact that the radially expanded portions are formed in axially central areas on the inner peripheral surfaces of the collars, no resistance to press-fitting is created at the radially expanded portions when the inner cylinder members are press fitted into the cylindrical parts of the collars on their inner peripheries, and even if a shaving powder is produced upon press fitting, it intrudes into the radially expanded portions, without obstructing the press fitting and consequently, press fitting can be performed fairly easily. Besides it is possible to conduct the press fitting securely with a sufficient interference at both axial end portions other than the radially expanded portion.

In a state of use where the drive side collars and the driven side collars are connected respectively to drive shafts and driven shafts, the step formed between the radially expanded portion and the other portion on the inner periphery of the cylindrical part of each of the collars serves as a hook to an axial deviation of the press-fitted inner cylinder members in cases where a high load occurs in the axial direction owing to a vibration, etc., as a result of which any axial deviation and disconnection can be avoided, thus maintaining a good press-fit condition.

With the elastic coupling stated above, it is preferred that the cylindrical parts of the collars and the inner cylinder members be close fitted together by press fitting; and an inside diameter difference between the radially expanded portion and the other portion on the inner peripheral surface of each cylindrical part be set larger than an interference value for press fitting of the inner cylinder members to the cylindrical parts. Thereby it is possible to perform the press fitting easily and firmly without causing any press-fit resistance at the radially expanded portions on the inner peripheries of the collars as stated above.

Preferably the flange parts on the outer periphery of each collar assume a taper form such that the thickness of each flange part gradually tapers down from a base portion to an external edge thereof whereby axial rigidity of the flange parts can be ensured sufficiently even if the collars are an integrally molded product made of a light-weight metal such as aluminum or Al-containing metal.

BRIEF DESCRIPTION OF THE DRAWINGS

The modes in which the invention are implemented will be described in more detail by way of examples with reference to the accompanying drawings, in which.

DESCRIPTION OF THE PREFERRED EMBODIMENTS

Figure 1:
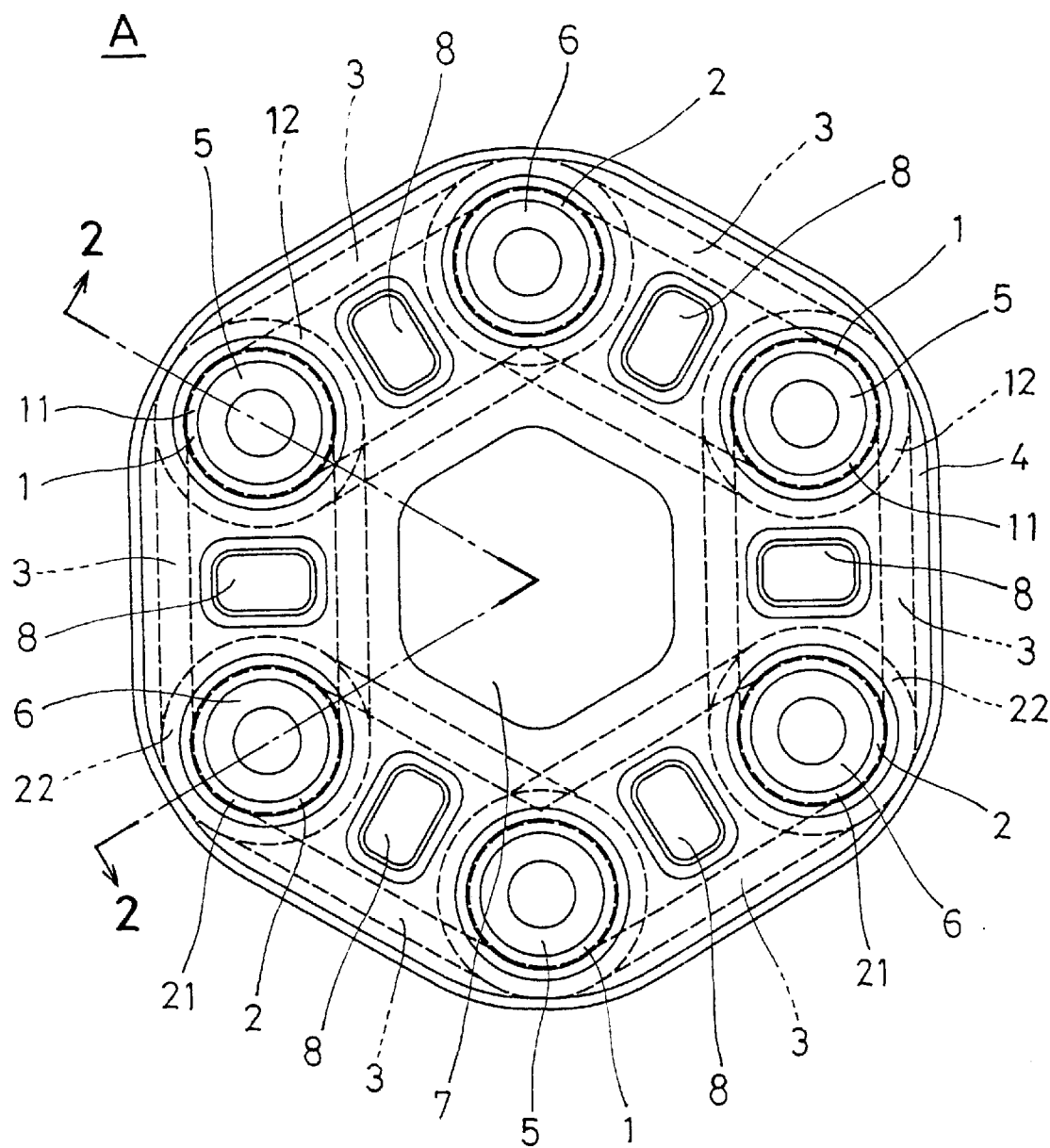
FIG. 1 is a schematic front elevation showing one example of an elastic coupling pertaining to this invention.
Figure 2:
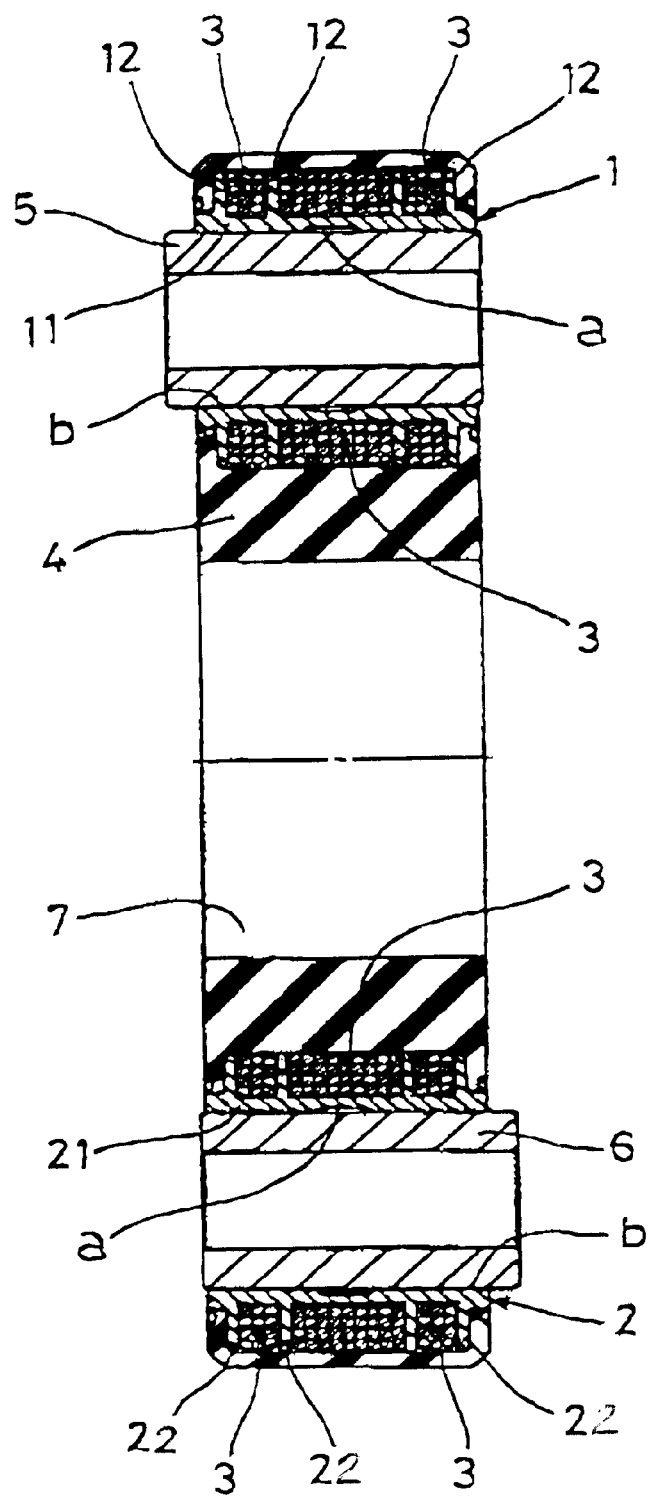
FIG. 2 is a sectional view taken along 2—2 line of FIG. 1.
Figure 3:
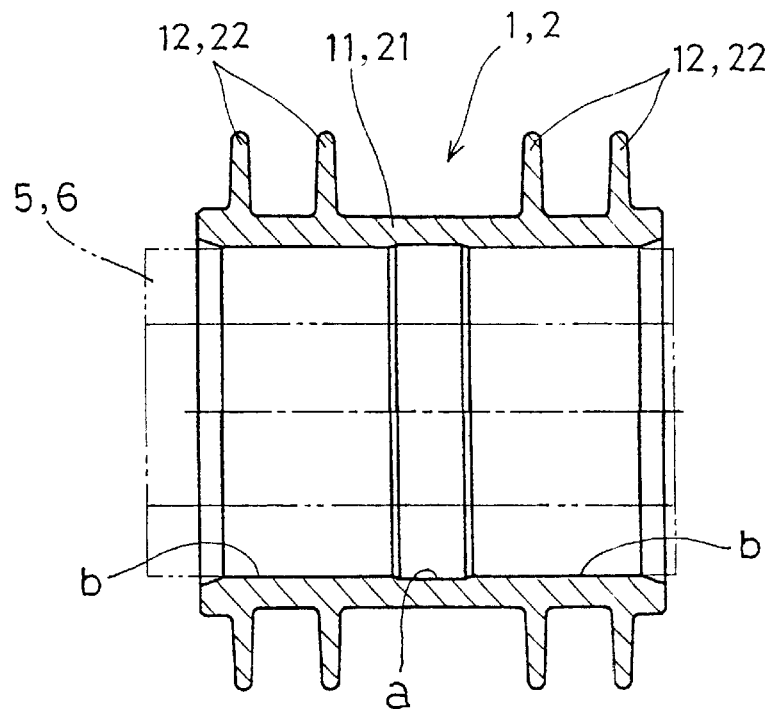
FIG. 3 is a longitudinal sectional view of each collar.

In an elastic coupling A in an illustrated example of FIGS. 1 to 4, the reference numeral 1 designates cylindrical drive side collars adapted to be connected to drive shafts, and the reference numeral 2, cylindrical driven side collars adapted to be connected to driven shafts. The aforesaid drive side and the driven side collars 1, 2 are arranged in a plural number of pieces, for example three pieces as illustrated, alternately at intervals of an equal distance on a concentric circle. Of the respective collars 1, 2, between the drive side collars 1 and the driven side collars 2 adjacent to each other there are wrapped endless belt-like fiber bundles 3 formed by winding multi-layer, multi-row reinforcing cords made of synthetic fiber yarns such as polyester fiber in a loop form. To inner peripheries of the drive side collars 1 and of the driven side collars 2, inner cylinder members 5 and inner cylinder members 6 made of metal, e.g. iron are close fitted by press fitting, respectively. The respective collars 1, 2 and the belt-like fiber bundles 3 are embedded in an elastic material 4 of a rubber or synthetic resin so that inside holes of respective collars, namely inner holes of the inner cylinder members 5, 6 may be exposed outside, and thus integrally formed to assume a generally rectangular form in cross section and an annular configuration of a generally polygon or circle as viewed from the front side.

According to this invention, the drive side and the driven side collars 1, 2 are integrally shaped by a casting means such as die casting from a relatively light-weight metal material such as aluminum or its alloys and have cylindrical parts 11, 21, respectively. The cylindrical parts 11, 21 are formed, at outer peripheral surfaces thereof, integrally with a plurality of flange parts 12, 22, respectively housing and holding therein wrapping portions of the belt-like fiber bundles 3. Thereby the belt-like fiber bundles 3 can be housed and held in place in the flange parts in a wrapped state.

With the illustrated example, two kinds of belt-like fiber bundles having different sectional surfaces are used as the belt-like fiber bundles 3 and four flange parts are formed at required intervals in a manner that the wrapped belt-like fiber bundle 3 of a larger sectional area is disposed in the center and the other wrapped ones 3 of a smaller sectional area are disposed at both sides.

The cylindrical parts 11, 21 are formed, in respective axial center areas of inner peripheral surfaces thereof to be slightly radially expanded from the other areas, whereby there is formed a step between the radially expanded portion (a) and the other portion (b).

The radially expanded portion (a) on the inner peripheries of the cylindrical parts 11, 21 has an axial width commensurate with a wrapping width of the belt-like fiber bundle 3 having a larger sectional area located in the central area. Its diameter-increasing amount, namely a step amount (Da) by the radial expansion is set to be larger than ½ of an interference value by press fitting of the inner cylinder members 5, 6 to the cylindrical parts 11, 21, namely considering a difference between an outside diameter (D2) of the inner cylinder members 5, 6 and an inside diameter (D1) of the cylindrical parts 11, 21. For example, in the case where the interference value is 0.3 to 0.6 mm, preferably 0.35 mm, the step amount (Da) is set to be 0.15 to 0.3 mm, particularly preferably on the order of 0.2 mm If the aforesaid interference value is smaller than the aforesaid range, the fit force by press fitting will be decreased whereas if it is larger than the above, the press fit force becomes so large that the press fitting becomes difficult. Further, if the step amount (Da) is made smaller to make the interference value larger, then the press fitting becomes difficult. As a consequence, it is preferred that the step amount (Da) be set to be larger than the interference value and a load due to the resistance to press fitting be decreased at the radially expanded portions (a).

Figure 4:
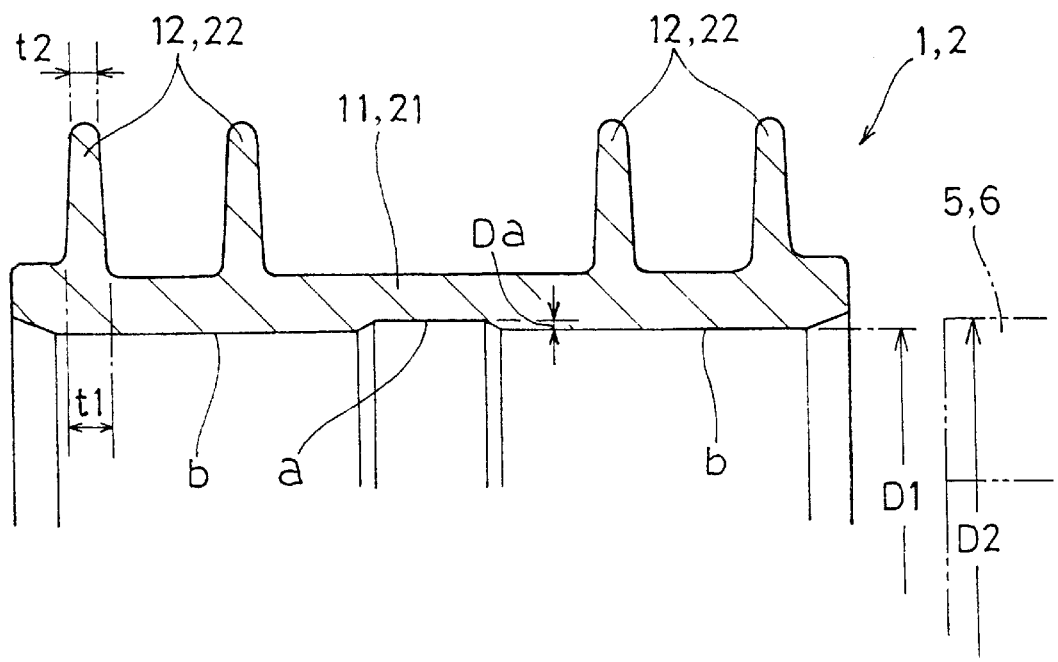
FIG. 4 is a partial enlarged view of FIG. 3.
Figure 5:
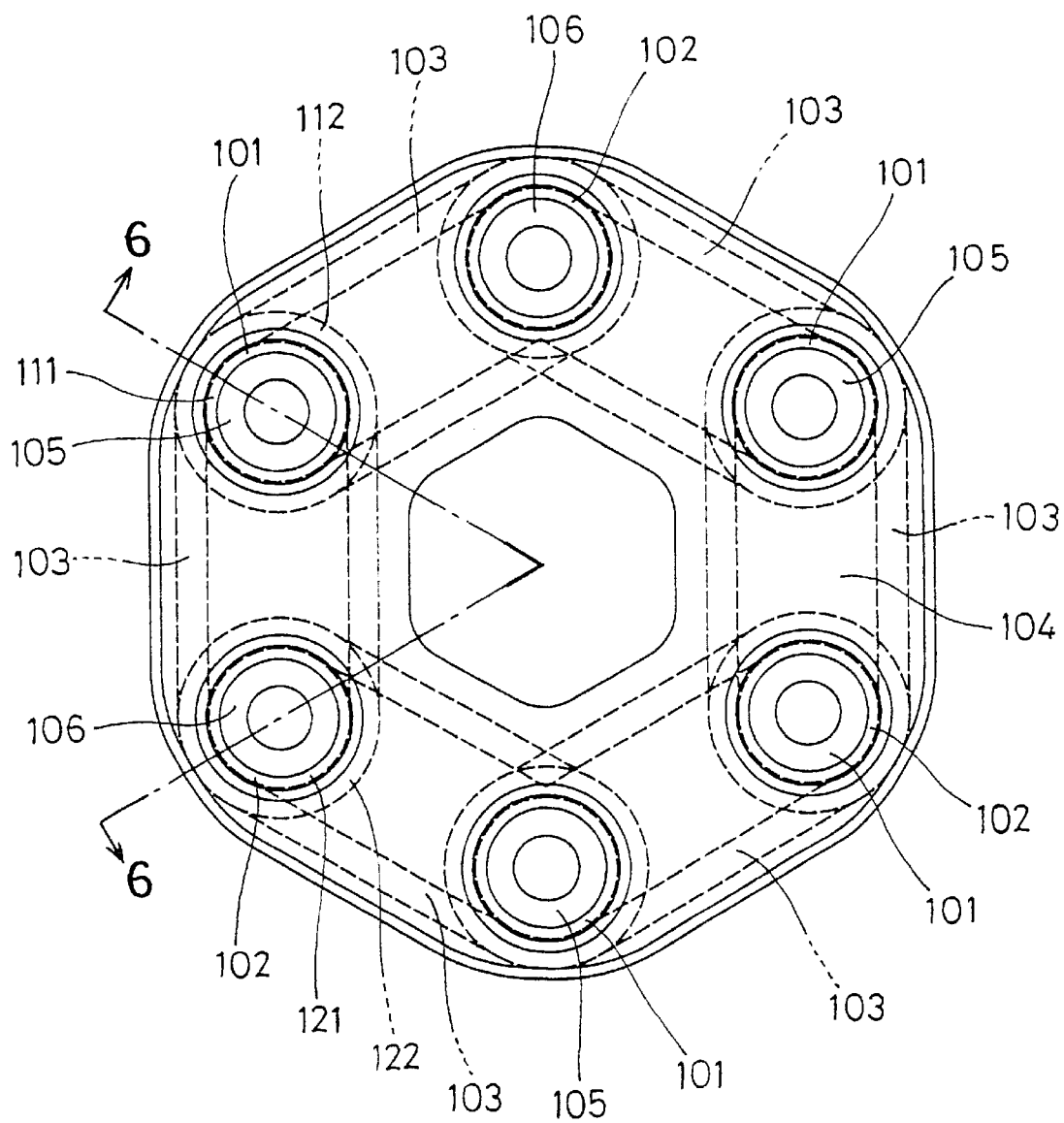
FIG. 5 is a schematic front elevation showing one example of a prior art elastic coupling.
Figure 6:
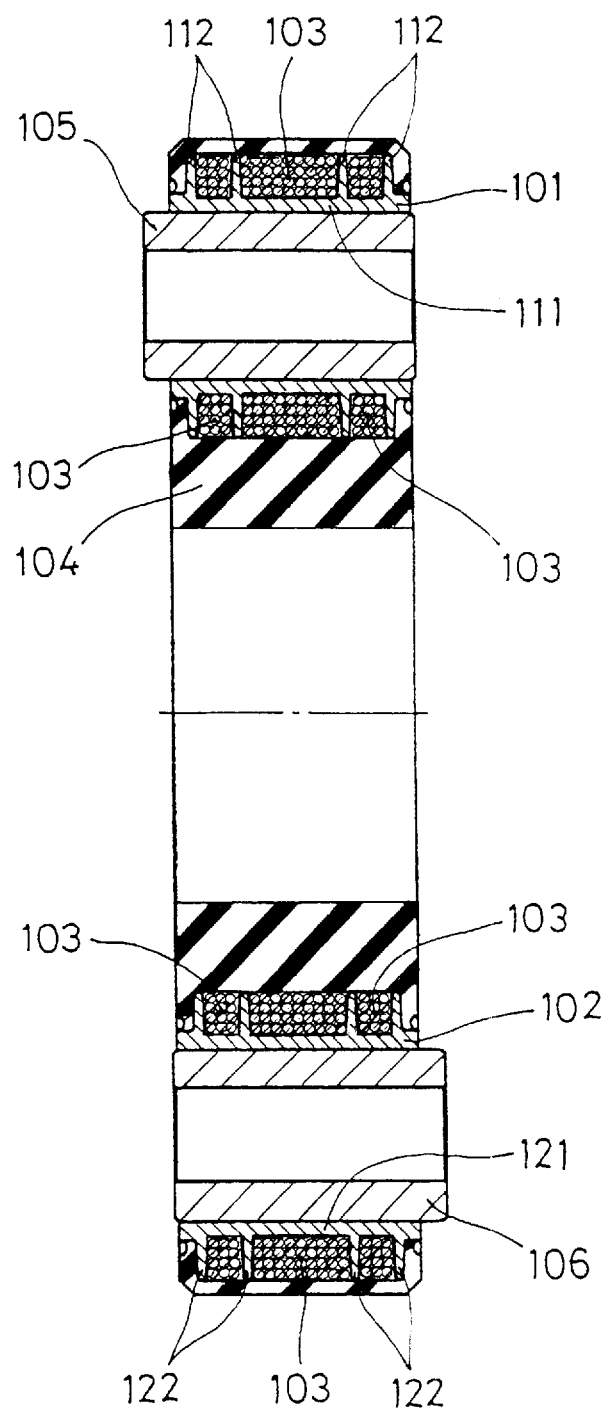
FIG. 6 is a sectional view taken along 6—6 line of FIG. 5.

In cases where the flange parts 12,22 at the outer peripheries of the drive side and driven side collars 1, 2 are a die cast product made of aluminum or an aluminum-containing metal, they assume, as shown in FIG. 4 in an enlarged scale, a taper form such that their thickness tapers gradually down from the base portion to the external edge thereof. The degree of the taper varies depending upon the kind of metal material to be used, but a ratio of the thickness (t1) of the base portion to that (t2) of the external edge is set to be 1.3 or more, preferably in a range of about 1.4 to 1.6, so that a sufficient strength to the axial load can be ensured. For example, where a radial projecting dimension is 5 mm, the thickness (t1) at the base portion is set at 1.5 mm and the thickness (t2) at the external edge is set at about 1.1 mm.

The reference numeral 7 designates an inboard aperture of the annular elastic coupling A, and the reference numeral 8, cutout holes mainly for saving of the material and escaping the rubber volume when a torsional torque is input at a compressed side.

In another examples, two belt-like fiber bundles with a smaller sectional area or two belt-like fiber bundles with a larger sectional area may be wrapped alternately around the drive side and driven side collars 1, 2; in either case flange parts for holding the belt-like fiber bundles are provided, as is the case with the aforementioned example.

According to the elastic coupling A described above, upon fabrication, when the inner cylinder members 5, 6 are press fitted into the die cast collars 1, 2, axially central areas of the inner peripheral surfaces of the collars 1, 2 are formed to be radially slightly expanded, so that no resistance to press fitting is generated at the radially expanded portions (a). Moreover, even if any shaving powder is produced upon press fitting, it intrudes and escapes into the radially expanded portions (a), with the result that the press fitting is by no means obstructed and can be easily achieved without its force being excessively large. Further, it is possible to press fit securely and firmly with a sufficient interference at both axial ends other than the radially expanded portion (a).

When used for a power transmission part of an automobile such as drive shafts, propeller shafts, etc., the drive side collars 1 are fastened through the inner cylinder members 5, which are press fitted to the collars 1, to the drive shafts while the driven side collars 2 are fastened through the inner cylinder members 6, which are press fitted to the collars 2, respectively by means of fastening means such as bolts, etc. whereby to perform a power transmission while absorbing vibration, torsion, etc.

During use, if a large load in the axial direction is generated owing to vibration or the like, the steps between the radially expanded portion (a) and the other portion (b) in the inner peripheries of the cylindrical parts 11, 21 of the collars 1, 2 serve as a hook to any axial deviation of the inner cylinder members 5, 6. As a result, any axial deviation or disconnection of them is prevented and a good press fitting condition can be held, whereby it is possible to enhance the durability.

As thus far described, according to the elastic coupling of this invention it is possible to press fit easily and firmly the drive side and driven side collars to the inner cylinder members with a sufficient interference, to use it without a danger of deviation or disconnection, and to enhance the durability and reliability.

What is claimed is:

1. An elastic coupling, comprising:
   drive side cylindrical collars and driven side cylindrical collars arranged equidistantly and alternately on a concentric circle, each of the drive side cylindrical collars and the driven side cylindrical collars being formed of metal and including, integrally formed thereon, a cylindrical part of a generally tubular configuration presenting an inner peripheral surface and an outer peripheral surface and flange parts extending radially outward from the outer peripheral surface of the cylindrical part;
   endless fiber bundles in belt form each wrapping around an adjacent pair of a one of said drive side cylindrical collars and a one of said driven side cylindrical collars such that they are captively received about the cylindrical part and between the flange parts of each of the drive side and driven side cylindrical collars;
   an elastic material having embedded therein the drive side and driven side cylindrical collars and the fiber bundles wrapped therearound; and
   inner cylinder members formed of metal each being receivable in press-fit engagement with the inner peripheral surface in the cylindrical part of each of the drive side and driven side cylindrical collars for connection, respectively with a drive shaft and a driven shaft, the cylindrical part of each the drive side and driven side cylindrical collars including, in an axially central area of the inner peripheral surface thereof, a radially expanded portion from another portion of the inner peripheral surface which extends axially to opposed ends of the cylindrical part from the radially extended portion, a difference in an inside diameter between the radially expanded portion and said another portion on the inner peripheral surface of each said cylindrical part is set to be larger than an interference value between the inner peripheral surface of the cylindrical part and a one of the inner cylinder members receivable in press-fit engagement therewith.

2. The elastic coupling according to claim 1, wherein said inner cylinder members each have a generally straight cylindrical shape of approximately uniform diameter end to end.

3. The elastic coupling according to claim 1, wherein the flange parts extending outwardly from the outer peripheral surface of the drive side and driven side cylindrical collars each assumes a taper form gradually diminishing in thickness from a base portion to an external edge thereof.

4. The elastic coupling according to claim 3, wherein:
   the flanges are die-cast of a material including aluminum; and
   a ratio of a thickness of the base portion to another thickness of the external edge of the flange parts is at least about 1.3.

* * * * *